United States Patent [19]
Arnold

[11] 3,844,313
[45] Oct. 29, 1974

[54] APPARATUS AND METHOD FOR MAKING A TEST CONNECTION TO A TUBULAR MEMBER

[75] Inventor: James F. Arnold, Houston, Tex.

[73] Assignee: Hydrotech International, Inc., Houston, Tex.

[22] Filed: Apr. 26, 1973

[21] Appl. No.: 354,800

Related U.S. Application Data

[62] Division of Ser. No. 185,084, Sept. 28, 1971.

[52] U.S. Cl. ................................ 138/90, 403/5
[51] Int. Cl. ............................................ F16l 17/02
[58] Field of Search .......... 138/90, 91, 93; 166/101, 166/120, 121, 122, 135, 140, 179; 403/5

[56] References Cited
UNITED STATES PATENTS

| | | | |
|---|---|---|---|
| 2,481,013 | 9/1949 | Henderson | 138/90 |
| 2,655,182 | 10/1953 | Hayes et al. | 138/90 |
| 3,561,490 | 2/1971 | Little | 138/90 |

Primary Examiner—Jerry W. Myracle

[57] ABSTRACT

An internal-fitting plug or coupling and method for making a connection to a tubular member. The coupling or plug is arranged for mounting in telescopic relationship with a cylindrical member. The coupling or the plug is provided with a pair of axially spaced apart annular recesses which face in a generally radial direction at the interface between the coupling or plug and the cylindrical member. An annular resilient seal is supported in one of the recesses in such a manner as to form an annular closed chamber therebehind and with the seal arranged for sealing between the coupling or plug and a tubular member. Conduits are provided in the coupling or plug for applying a fluidized pressure to the annular space back of the seal to move the seal into the sealing position. A gripping element is supported in the other of the recesses and is arranged for moving to position for locking the coupling or plug in telescopic relationship with the tubular member upon the application of a fluid pressure thereto. The coupling of this invention may be utilized for making connection to the internal end of the tubular member so as to complete a flow conduit through the tubular member. The coupling or plug of this apparatus may also be used to seal the end of the tubular member which is to be pressure tested and wherein line pressure in the tubular member is used to facilitate closure of the tubular member during testing, for example.

24 Claims, 12 Drawing Figures

PATENTED OCT 29 1974 3,844,313

APPARATUS AND METHOD FOR MAKING A TEST CONNECTION TO A TUBULAR MEMBER

CROSS-REFERENCE TO RELATED APPLICATION

This application is a division of co-pending application Ser. No. 185,084, entitled Apparatus and Method For Making a Connection to a Tubular Member, filed on Sept. 28, 1971, by the same applicant herein.

BACKGROUND OF THE INVENTION

1. Field of the Invention

This invention relates to an apparatus such as a coupling or plug for making connection to a generally cylindrical member such as the end of a pipe. More specifically, this invention relates to a coupling or plug for making a connection with the end of a pipe, which connection is effected without rotation of the pipe or the coupling or plug member and which connection provides a fluid-tight seal and which resists both tension and compression forces as well as rotational forces.

In particular, it utilizes fluid pressure for sealing with and gripping the tubular member in such a manner as to require only a very small axial length to accomplish a connection.

2. Description of the Prior Art

Hydraulically actuated couplings have been utilized in the prior art, but for the most part they are rather complex equipment, being relatively expensive to manufacture, and are generally of relatively long axial length, thus making them of a size and shape which is not suitable for all connecting operations.

Other hydraulically actuated couplings are known in the prior art which are more limited in axial length, but usually the apparatus of this type require extremely close tolerances between the ID of the coupling and the OD of the pipe to which the connection is made in order to effect sealing thereof and in order to effect the actuation of the gripping means.

In addition, it is desirable to have a connection device such as a coupling or plug, which can set by the application of fluid pressure and in which the sealing effected by the coupling can be tested thereafter. It is also desirable to have a coupling or plug of the type which can be hydraulically or fluid actuated and subsequently deactivated and removed once the purpose of the connection is ended.

SUMMARY OF THE INVENTION

It is therefore an object of this invention to provide an improved apparatus and method for making a connection to a generally cylindrical member such as a pipe, which is relatively simple of construction and easily operated. The apparatus of this invention is arranged for making a connection to a generally cylindrical member such as a pipe and includes a housing in the form of an internally-fitting plug which is arranged for mounting in telescopic relationship with the cylindrical member. The housing member and the cylindrical member are provided with two axially spaced apart annular recesses, with each of the recesses facing in a generally radial direction. It is to be understood that these recesses may be provided in either the housing member or the cylindrical member or both.

An annular resilient seal is supported in one of the recesses and thereby forms an annular closed chamber radially therebehind. The seal is arranged for sealing engagement between the members upon radial deformation thereof. Means are provided for fluid pressurizing the annular chamber to thereby radially deform the seal into sealing position. The invention includes means supported in the other of the recesses for locking the members in the telescoped position upon actuation thereof; and fluid pressure actuated means are provided for moving the locking means to the locking position upon actuation. The locking means may be in the form of a slip ring or grip ring supported by a resilient seal ring mounted in the other recess and forming another annular closed chamber radially therebehind. The means for actuating the locking means may include means for fluid pressurizing the other closed chamber to thereby radially deform the seal ring which has mounted thereon means to engage between the members to hold them in the aforesaid telescopic position. It is to be understood that the housing member and the cylindrical member may be provided with one or more seals and one or more locking means of the aforesaid types.

In addition, in certain embodiments the apparatus may be arranged to seal with both the external or internal surface of the tubular member and to frictionally engage both the internal or external surfaces thereof.

Broadly stated, the method of this invention is for making a connection between a coupling member and a generally cylindrical member. It includes the steps of telescopically mounting the coupling member with the cylindrical member, with the members having formed therein two axially spaced apart annular recesses, with each of the recesses facing in a generally radial direction. It includes supporting an annular resilient seal in one of the recesses to thereby form a closed annular chamber thereby radially behind. Fluid pressure is then applied to the annular chambers therebehind to move the seal radially into sealing engagement between the members. The method also contemplates supporting means for locking the members in the telescopic position in the other of said recesses and applying a fluid pressure force to the locking means to thereby move the locking means to the locking position.

The method of this invention also contemplates using line pressure or internal pressure within the tubular member for helping to effect locking of the housing member therewith.

It is to be understood that the terms "housing member" and "coupling member" may sometimes be used interchangeably. Similarly, the term "cylindrical member" may sometimes be used to refer to a tubular member as, for example, a structural member or a pipe.

Sometimes the terms "locking means", "holding means" and "gripping means" may be used interchangeably to denote means for frictionally engaging between the coupling or plug and the tubular member to which connection is being made.

DESCRIPTION OF THE PREFERRED EMBODIMENT

Figure 1:
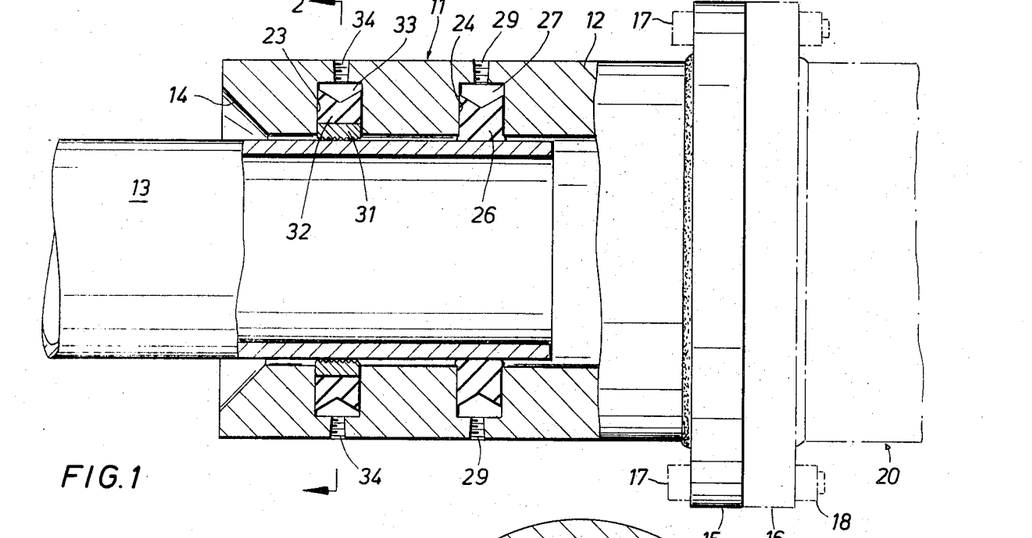
FIG. 1 is a side elevation view partly in central section of one embodiment of an overfitting coupling embodying the invention, which may be useful for completing a connection in a pipeline, and which is claimed in said co-pending application Ser. No. 185,084.
Figure 2:
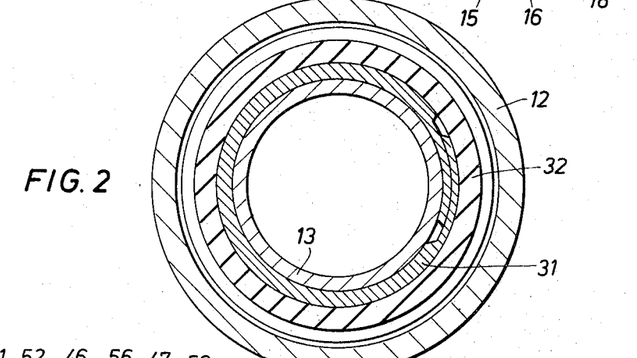
FIG. 2 is a cross-section taken generally along Line 2—2 of FIG. 1.

Referring now to FIG. 1, a housing member is shown in the form of a coupling generally designated by the numeral 11, having an outer shell 12 which is arranged for telescopic positioning over the end of pipe 13 as shown. The left end of outer shell 12 as shown in FIG. 1 is provided with a bevelled annular surface 14 to facilitate the sliding of coupling 11 over pipe 13. The right end of coupling 11 is provided with straight flange 15 which is attached to outer shell 12 as by welding or the like. Flange 15 is shown attached to a mating flange 16 by means of a plurality of flange bolts 17 having nuts 18 threaded thereon. Flange 16 is shown connected as by welding to another coupling 20 which may be of the same type as coupling 11 or of a conventional type coupling. It is to be understood that flange 15 is not considered a part of the invention herein inasmuch as the right end of outer shell 12 can be connected to other means as, for example, it could be formed integral with coupling 20 or could be formed integral with other connecting means.

Outer shell 12 is provided with a pair of axially spaced apart annular recesses 23 and 24 which face generally radially inwardly near the interface between the ID of outer shell 12 and the OD of pipe 13.

An annular resilient seal 26 is shown mounted in or supported in recess 24, thereby forming a closed annular chamber 27 radially outwardly therefrom or radially therebehind. The radially outward surface of seal 26 is provided with a V-shaped groove which thereby provides lips for sealing and engaging the sides of recess 24, thereby facilitating sealing therewith. It is to be understood that recess 24 and seal 26 may be tapered at the rate of approximately 6° in a radially inward direction to increase or improve this sealing arrangement. Further, seal 26 is arranged for sealing engagement between outer shell 12 and pipe 13 as shown upon radial deformation thereof.

Means are provided for fluid pressurizing annular chamber 27, to thereby radially deform seal 26 into the sealed position. These means include fluid inlets 29 passing through outer shell 12 and are connected to appropriate valve and conduit means which in turn are connected to appropriate sources of pressurized fluid, as for example, pressurized hydraulic fluid. Moreover, inlets 29 may be provided with one-way check valves, for instances, (not shown) such that hydraulic oil applied thereto will be retained therein to effect permanent sealing thereof. In addition, if permanent installation is desired, the pressurizing fluid may be an epoxy resin which is arranged for setting up after a short period of time.

The coupling also includes means supported in the other recess, i.e. recess 23, for locking or holding outer shell 12 and pipe 13 in the telescopic position shown in FIG. 1. These locking means conveniently take the form of split slip ring 31 which is provided with gripping teeth on the internal surface thereof which are arranged for frictionally engaging the external surface of pipe 13 upon radial movement thereof. Slip ring 31 is supported on the radially outward side thereof by a resilient grip seal ring 32 which is provided with a V recess around the external surface thereof, the same as with seal 26. It is to be understood that recess 23 and ring 32 may likewise be tapered radially inwardly in the amount of approximately 6° to facilitate support and sealing of ring 32 in recess 23. It is to be further understood that seal 26 and ring 32 can be made of rubber neoprene or the like. Upon radially inward deformation of ring 32, slip ring 31 is thereby urged into frictional holding or locking engagement with pipe 13, thereby fixing outer shell 12 with pipe 13 in the telescoped position as shown. Grip seal ring 32 may sometimes be described as fluid pressure actuated means for moving the locking means to the locking position upon actuation thereof. Further, ring 32 forms an enclosed annular chamber 33 radially outwardly therefrom or therebehind to which fluid pressure may be applied through inlets 34 provided in outer shell 12. Inlets 34 are similar to inlets 29 and both have appropriate fittings for connection to valves and conduits and the like, which are connected to appropriate pressurized fluid sources such as pressurized hydraulic fluid. In addition, inlets 34 may be connected to one-way valves to entrap in annular chamber 33 any pressurized fluid applied thereto. If it is desired to have a permanent connection of outer shell 12 with pipe 13 the pressurized fluid may be in the form of pressurized epoxy resin, which upon setting permanently maintains ring 32 in a radially inwardly deformed position and with slip ring 31 permanently engaged with pipe 13.

In operation or installation of coupling 11 on pipe 13, it is to be understood that seal 26 and ring 32 would be initially in a relaxed position and thereby out of contact with pipe 13, as would be slip ring 31. This permits the sliding of outer shell 12 over pipe 13 initially, after which the setting can be effected as shown in FIG. 1. While epoxy resin has been described as one form of hardenable material to effect permanent setting, it is to be understood that other materials can be used as, for example, cement which also sets up after a short period of time.

It will be observed that the coupling shown in FIG. 1 is of relatively short axial dimension, is simple of construction, and is easily installed on pipe 13. Moreover, the coupling ID tolerance with the OD of pipe 13 is not critical since seal 26 and ring 32 each form an annular chamber there-behind with outer shell 12 which provides the means for positively effecting the sealing and setting operation regardless of any variations in spacing distance between the OD of pipe 13 and the ID of shell 12, as is a problem with certain prior art devices. It is also to be understood that outer shell 12 may be provided with two or more recesses accommodating two or more seals of the type of seal 26 and may be provided with two or more recesses arranged for accommodating additional grip seal rings 32 and slip rings 31.

Figure 3:
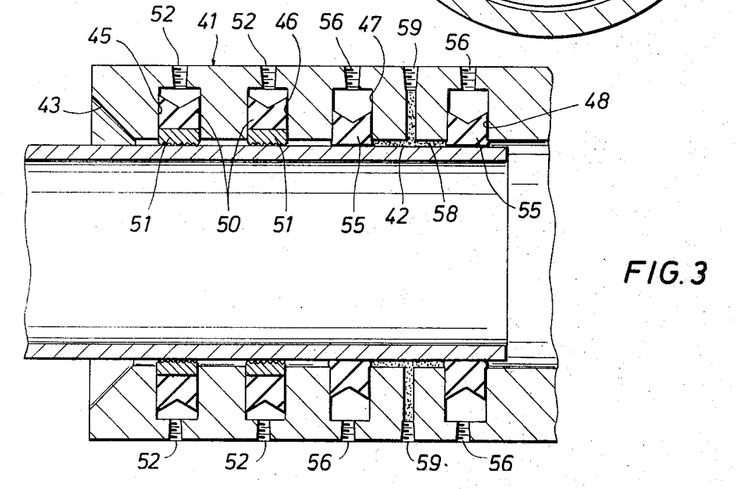
FIG. 3 is a central sectional view of an alternate embodiment of the invention, which may be used for making a connection to the end of a pipe, and which is claimed in said co-pending application Ser. No. 185,084.

Referring now to FIG. 3, an alternate embodiment of the invention will be described. The housing of this embodiment is in the form of a generally tubular shaped coupling member 41 arranged for telescopic positioning over the end of pipe 42 as shown. The left end of coupling member 41 is provided with a bevelled annular end surface 43 to facilitate positioning of coupling member 41 over the end of pipe 42. The right end of coupling member 41 is broken away and may be attached to a flange member or other connection means for completing the connection.

Coupling member 41 is provided with four axially spaced apart annular recesses designated by the numerals 45, 46, 47 and 48 which face generally radially inwardly toward pipe 42. Recesses 45 and 46 are each shown having mounted therein an annular resilient grip seal ring 50 which is similar to ring 32 of the prior embodiment. In addition, recesses 45 and 46 and the respective rings 50 mounted therein each support an annular split grip ring 51 which is similar to ring 31 of the prior embodiment and is provided with teeth on the radially inward side thereof which are arranged for grippingly engaging the external surface of pipe 42. It is to be understood that these gripping means need not be annular in form, but may be segmented slips or ring portions which are bonded or otherwise held by the respective back-up rings 32 or 50.

As with the prior embodiment, rings 50 each form an annular enclosed chamber therebehind which is arranged for pressurization with a pressure fluid such as hydraulic fluid or pressurized epoxy or the like through inlets 52 formed in coupling 41. It is to be understood that inlets 52 are connected with the appropriate valving such as one-way valves, for example, which may be used to permanently entrap any fluids pumped into the annular chambers formed back of grip seal rings 50.

Recesses 47 and 48 each have supported therein an annular resilient seal 55 which is similar to seal 26 of the prior embodiment. It will be noted that each of the seals 55 forms annular closed chambers radially therebehind to which pressurized fluid may be applied through inlets 56 provided in coupling member 41. Likewise, inlets 56 are connected with appropriate valve and conduit means such that any pressurized fluid, such as epoxy resin or the like, may be permanently retained therein.

It will also be noted that each of the grip seal rings 50 and seals 55 is provided with a V-shaped groove about the radially outward surface thereof, which provides lips on each axial end thereof which facilitates the sealing thereof in the respective recesses. It is to be understood that recesses 45–48, as well as rings 50 and seals 55, may be tapered radially inwardly at the rate of approximately 6° to facilitate this sealing and the supporting of grip seal rings 50 and seals 55 in their respective recesses.

The embodiment of the invention shown in FIG. 3 is also provided with means for effecting bonding of coupling 41 to pipe 42. It will be noted that recesses 47 and 48 are axially adjacent to each other; and when seals 55 are moved to the sealing position shown in FIG. 3, there is formed between the seals 55 and between the external surface of pipe 42 and the internal surface of coupling member 41 an annular bonding chamber 58. Bonding chamber 58 may be pressurized with a pressurizing fluid through inlets 59 provided in coupling member 41. Hence, bonding chamber 58 may be used to determine whether or not seals 55 are effectively sealing between coupling 41 and pipe 42. Alternatively or subsequently, bonding chamber 58 may be pressurized with a hardenable material, such as epoxy resin or the like, which, upon hardening, effects a permanent bond between pipe 42 and coupling 41. Moreover, the opposed surfaces of coupling member 41 and pipe 42 between seals 55 may be provided with a roughened surface, such as threads (not shown) or the like, to increase the bonding of the hardenable material therewith.

During installation of the apparatus shown in FIG. 3, it is to be understood that rubber grip seal rings 50 and seals 55 would initially be in a relaxed position and thus retracted out of initial contact with pipe 42, as would be slip rings 51. Thereafter, seals 55 would be set upon application of pressurized fluid thereagainst as described above. Thereafter, the sealing may be tested by the application of fluid pressure to chamber 58. If it is determined that good seals have been effected, then fluid pressure can be applied to move slip rings 51 to the locking or holding position as shown in FIG. 3. Thereafter, epoxy fluid may be forced into bonding chamber 58 to complete installation.

The embodiment of the invention shown in FIG. 3 provides increased gripping force or holding force between the coupling 41 and pipe 42 and can be used for permanent installation. For example, this type of coupling may be used to connect two pieces of pipeline together or may be used to make a connection to any type of cylindrical object such as pipe 42. Again, this embodiment of the invention is relatively of a short dimension in the axial direction and can be utilized in connections to pipe having substantial variation in OD uniformity.

The apparatus of this invention is particularly useful in that extremely close tolerances between the ID of the coupling member 41 and the outside diameter of pipe 42 are not critical. For example, with pipes having a 4-in. OD, it has been found that there may be as much as ½ in. total difference in the OD of pipe 42 and the ID of coupling member 41. Referring to FIG. 3, annular bonding chamber 58 is positively formed by the setting of seals 55, thereby providing an enclosed and sealed bonding chamber 58 to which the epoxy resin may be flowed. Stated another way, the annular bonding chamber is pressurized with epoxy resin only after the seals 55 have been set in position in sealing engagement with pipe 42. It has been found that neoprene rubber is preferable for the annular seals and preferably of a Durometer of about 70. However, higher and lower Durometers within the range of 60–80 Durometers can be used.

Figure 4:
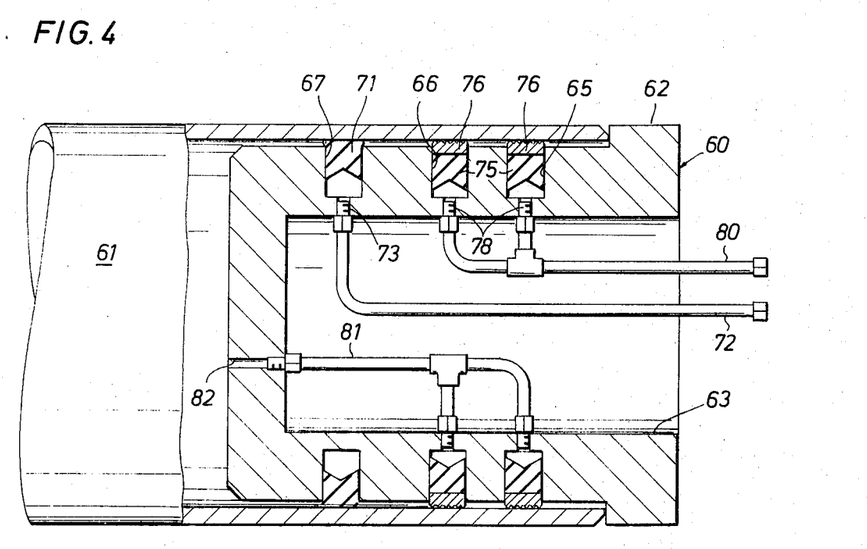
FIG. 4 is a generally central sectional view of an internal-fitting plug, which is arranged for sealingly closing the end of a pipe.

Referring now to FIG. 4, a further alternate embodiment of the invention will be described. A housing member in the form of internally-fitting plug 60 is shown mounted inside of the end of pipe 61. Plug 60 has an externally enlarged or raised portion 62 on the right end thereof as viewed in FIG. 4 which abuts against the end of pipe 61 as shown. Plug 60 is also provided with a counter bore 63 in which various conduits are inserted, which will be described hereinafter.

Plug 60 is also provided with three axially spaced apart annular recesses 65, 66 and 67, which face in a radially outward direction. Recess 67 has mounted therein an annular resilient seal 71, having a V-groove on the radially inward side thereof which is similar to seals 26 and 55 of the prior embodiments and form an annular chamber therebehind which is arranged for fluid pressurization through packer pressure line 72 communicating through inlet 73 provided in plug 60.

Upon application of fluidized pressure, either in the form of hydraulic fluid, epoxy resin or the like, through line 72, seal 71 is deformed radially outwardly into sealing engagement between internal plug 60 and the inside of pipe 61 to the position shown.

Recesses 65 and 66 each have mounted therein a resilient grip seal ring 75 which is similar to seal rings 32 and 50 except that they are arranged for radially outward deformation and are provided with a V-groove on the radially inward side thereof.

Grip seal rings 75 each support on the radially outward side thereof slip rings 76 which are arranged for frictionally engaging the internal surface of pipe 61 as shown. It is to be understood that slip rings 76 could be in the form of segmented portions bonded or otherwise held to their respective grip seal rings 75. In addition, grip seal rings 75 each form an annular closed chamber therebehind and which are provided with inlets 78 communicating thereto through plug 60. Fluid pressure may be applied through inlets 78 via pressure line 80 which may be connected to any convenient source of fluid pressure such as hydraulic fluid, pressurized epoxy resin, or the like. Alternatively, or in conjunction therewith, line pressure from the inside of pipe 61 may be applied through pressure line 81 communicating with the interior of pipe 61 through conduit 82 provided in plug 60.

In operation, seal 71 and grip seal rings 75 and split rings 76 would initially be held radially inward in the contracted position. Plug 60 is inserted into the end of pipe 61 and thereafter seal 71 is moved to the set position as shown by application of fluid pressure through line 72, which pressure could be held therein by appropriate one-way valving, or the like. After the seal has been accomplished, split rings 76 are set by the application of pressure through lines 80 and/or 81, thereby effecting setting of the tool. If it is desired to have a permanent connection, the pressure applied through lines 80 and/or 81 can be epoxy resin or the like and one-way valves may be provided to lock the fluid in the plug.

The apparatus of this embodiment is particularly useful for testing the pressure capabilities of certain tubular members such as pipe, pipe connectors, and the like. It provides a non-destructive type testing inasmuch as plug 60 may be removed if hydraulic fluid has been used as the setting medium. Moreover, this embodiment permits the use of line pressure in pipe 61 to provide part or all of the pressure for actuating the holding means. Again, this embodiment of the invention permits a connection with a tubular member, which connection covers only a very short axial dimension, with a simplicity of parts in operation.

Figure 5:
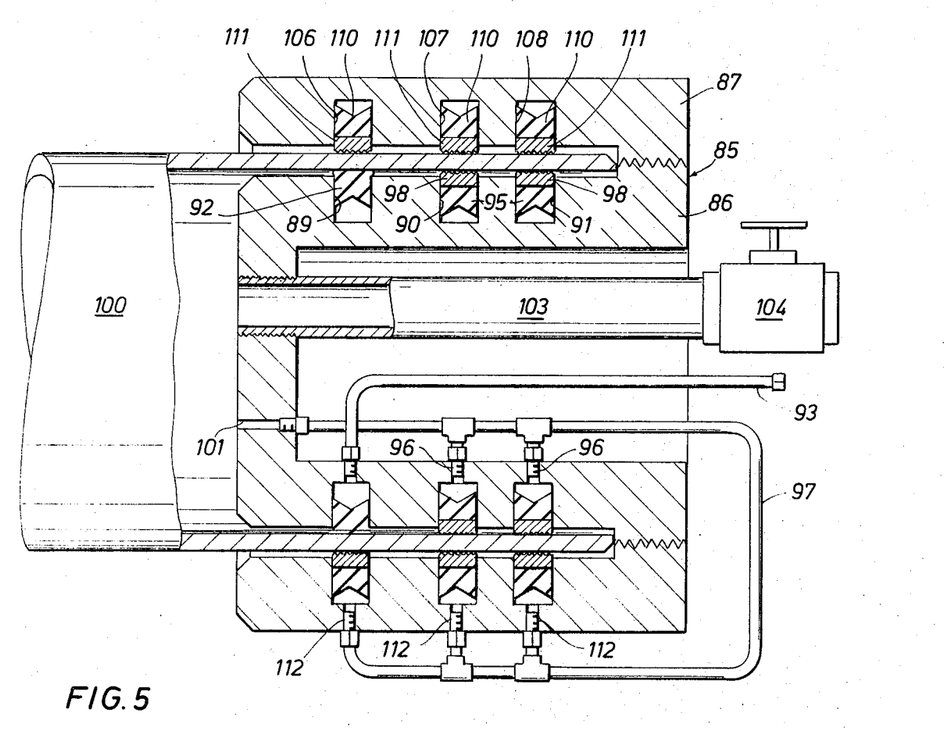
FIG. 5 is a generally central sectional view of yet another embodiment of the invention which is arranged to seal the end of the pipe closed and to frictionally engage both the internal and the external surface of the pipe, and which may utilize line pressure for effecting the frictional engagement of the plug.

Referring now to FIG. 5, a further alternate embodiment of the invention will be described. In this embodiment there is shown a housing 85 having an internal plug portion 86 and an external portion 87. Internal portion 86 is substantially similar to internal plug 60 of the FIG. 4 embodiment. It is provided with three annular recesses 89, 90 and 91 thereabout, which recesses face generally radially outwardly. The axially inward recess 89 has supported therein an annular resilient seal 92 which is similar to seal 71 of the prior embodiment and is arranged for radial outward deformation in response to fluid pressure applied to the radially inward side thereof, which is provided with a V-groove to effect sealing with recess 89. Fluid pressure to the annular chamber radially inwardly of or radially back of seal 92 is provided through packer pressure line 93 which is connected to an appropriate source of pressurized fluid such as hydraulic fluid, epoxy resin, or the like, and may be provided with a one-way valve to entrap pressure in the annular chamber radially inwardly of seal 92.

The axially outward recesses 90 and 91 each have supported therein a resilient grip seal ring 95 which is identical to grip seal rings 75 of the prior embodiment and forms a closed annular chamber therebehind which communicates through inlets 96 provided in internal plug portion 86 with pressure line 97. Pressure line 97 communicates with the interior of pipe 100 in which housing 85 is shown mounted through conduit 101 in internal plug portion 86. Each of the grip seal rings 95 has mounted radially outwardly thereof a split ring 98 which is similar to rings 76 of the prior embodiment and is arranged to be moved into contact with pipe 100 upon radially outward deformation of seal rings 95.

Internal plug portion 86 also has means for releasing pressure from the inside of pipe 100 and this is in the form of tube 103 which is threadably inserted into an opening in the left end of internal plug portion 86 as shown in FIG. 5. The other end of tube 103 is connected to relief valve 104 which may be operated at appropriate times to relieve pressure from within pipe 100.

This embodiment of the invention also has means for gripping the external portion of pipe 100 to hold housing 85 in the closed or telescoped position shown. External portion 87 is provided with three annular axially spaced apart recesses 106, 107 and 108, each of which has mounted therein an annular resilient grip seal ring 110 which is identical to grip seal rings 50 of a prior embodiment.

Each of the grip seal rings 110 supports on the radially inward side thereof holding means in the form of split slip rings 111, each of which is arranged for frictionally engaging the external surface of pipe 100 upon actuation thereof. Fluid pressure is provided to the annular chambers formed radially outwardly of each of the grip seal rings 110 by pressure line 97 communicating through inlets 112. It will be observed that split rings 111 are radially opposed to seal 92 and slip rings 98 which are mounted on the radially outward side of grip seal rings 95. This arrangement of the sealing and holding means prevents radial deformation of pipe 100 when extremely high pressures are encountered or contemplated.

In operation, housing 85 is mounted initially on the end of pipe 100 with seal 92 retracted and with each of grip seal rings 95 and 110 retracted. Thereafter, pressure is applied to packer pressure line 93 to effect setting and sealing of seal 92 on the internal surface of pipe 100. Thereafter, relief valve 104 is closed and pressure applied to the inside of pipe 100. Alternatively, pipe 100 may be pressurized through valve 104 and tube 103. Pressurization of pipe 100 causes pressure to be applied to pressure line 97, thereby effecting setting of split slip rings 111 and 98, thereby securely holding housing 85 in the fixed telescoped position as shown. Thereafter, when it is desired to remove housing 85, pressure is relieved on relief valve 104 and pressure is terminated on packer pressure line 93.

This embodiment of the invention is particularly useful for testing cylindrical objects such as pipe when extremely high pressures are contemplated. It involves non-destructive testing and provides a means for joining the plug with the pipe in such a manner that welding or the like is not required. It is simple of operation and effects the sealing and closing with a minimum axial distance involved.

Referring now to FIGS. 6–12, and FIGS. 6 and 7 in particular, various alternative embodiments for the locking means of this invention will be described.

Figure 6:
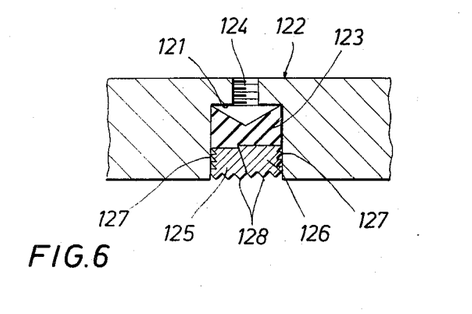
FIG. 6 is a fragmentary longitudinal sectional view of an alternate form of the locking means of this invention.
Figure 7:
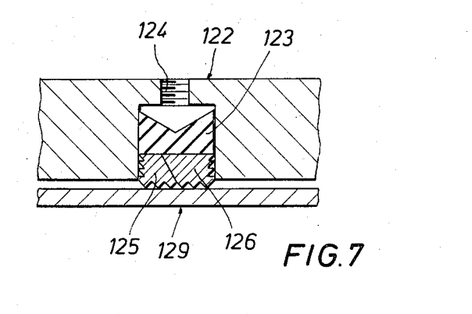
FIG. 7 is a view similar to FIG. 6 but showing the locking means actuated to the locking position.

In the embodiment shown in FIGS. 6 and 7, the locking means is shown mounted in an annular recess 121 of coupling housing 122. The locking means includes an annular grip seal ring 123 having a V-shaped side which forms an enclosed chamber with the bottom of recess 121, which is communicated to through inlet 124. The other radial side of grip seal ring 123 is arranged to abut against a pair of tapered grip rings 125 and 126. It is to be understood that grip rings 125 and 126 are split rings and arranged such that they will deform radially upon application of pressure applied by grip seal ring 123. In addition, grip rings 125 and 126 have opposed tapered surfaces on their adjacent sides and are provided with buttress-type threads 127 on the opposite ends thereof. Further, each of the grip rings 125 and 126 are provided with gripping teeth 128 which are arranged for frictionally engaging the cylindrical member to which connection is to be made, as for example pipe 129, to which connection is to be made.

In operation, fluid pressure, as for example pressurized epoxy, is applied through inlet 124 causing grip seal ring 123 to be moved radially toward grip rings 125 and 126, which in turn causes the teeth 128 thereof to contact pipe 129 and lock in locking position. Continued application of pressure against grip rings 125 and 126 causes the opposed tapered surfaces of grip rings 125 and 126 to shift, thereby causing the buttress threads 127 to engage the sides of recess 121 in increased locking position as shown in FIG. 7.

Figure 8:
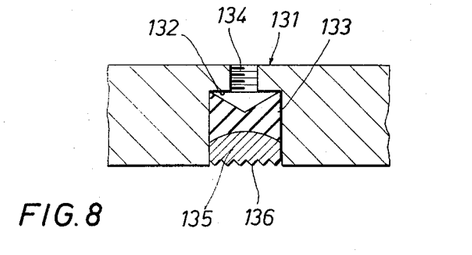
FIG. 8 is another fragmentary longitudinal sectional view of another alternate embodiment of the locking means of this invention.
Figure 9:
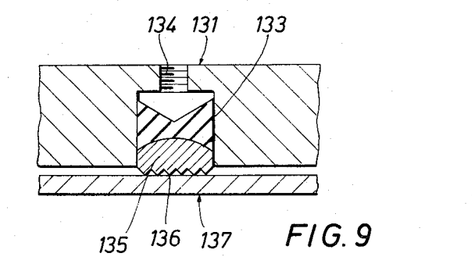
FIG. 9 is a view similar to FIG. 8 but showing the locking means actuated to the locking position.

Referring now to FIGS. 8 and 9, coupling housing 131 of this invention is provided with an annular recess 132 in which is mounted grip seal ring 133, one side of which is V-shaped in cross section and forms a chamber with the recess 132, which chamber is communicated with through inlet 134. The other side of grip seal 133 is arranged for abutting against and engaging with annular split grip ring 135. The radial side of grip ring 135 adjacent to grip seal ring 133 is generally arcuate in cross section and the opposite radial side is provided with gripping teeth 136 arranged for engaging pipe 137 upon actuation thereof.

In operation, fluid pressure, as for example pressurized fluid epoxy is applied through inlet 134 causing grip seal ring 133 to travel radially against grip ring 135. After grip ring 135 becomes engaged with pipe 137, continued application of pressure causes grip seal ring 133 to stop flowing. Since rubber is a solid whenever it cannot flow, this has the end result of locking grip ring 135 in place after the pressurized epoxy which has been applied through inlet 134 sets up. As an alternative arrangement, grip ring 135 might have a V-taper on the side adjacent to grip seal ring 133 instead of having a rounded surface as shown.

Figure 10:
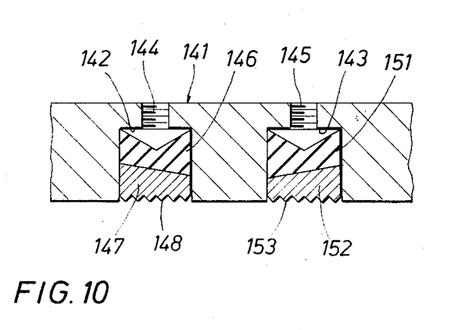
FIG. 10 is a fragmentary longitudinal sectional view of a still further alternate embodiment of the locking means of this invention.
Figure 11:
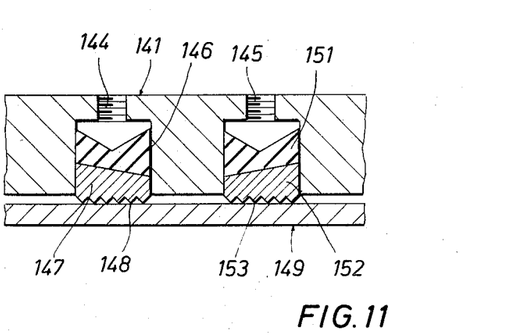
FIG. 11 is a view similar to FIG. 10 but showing the locking means actuated to the locking position.

Referring now to FIGS. 10 and 11, a coupling housing 141 is shown having a pair of axially spaced apart annular recesses 142 and 143, each of which is communicated with respectively by inlets 144 and 145.

Recess 142 has mounted therein grip seal ring 146 having a V-taper on the radial side adjacent to the base of recess 142 and having a tapered annular face on the opposite side thereof, which face is arranged for engagement with grip ring 147 which has a mating taper. Further, the opposite side of grip ring 147 is provided with gripping teeth 148 for engagement with and locking with pipe 149, upon actuation.

Recess 143 also has mounted therein another grip seal ring 151 which is provided with an annular V-recess about the side adjacent the base of recess 143 to form an annular closed chamber therewith. The opposite side of grip seal ring 151 is also tapered but in an opposite direction from that of seal ring 146 and similarly abuts grip ring 152 which has a mating taper. Both grip ring 152 and 147 may, as with the prior grip rings, be segmented or split rings such that they will be deformed in a radial direction upon application of radial pressure thereagainst. Further, grip ring 152 is provided with gripping teeth 153 similarly arranged for engagement with the pipe 149 upon actuation.

Upon operation, fluid pressure, such as pressurized epoxy, is applied to inlets 144 and 145 which causes grip seal rings 146 and 151 to move radially and, hence, causes grip rings 147 and 152 to move to the lock position as shown in FIG. 11. It will be noted that the opposite taper provided to grip rings 147 and 152 causes the same to lock each other in place in relationship to pipe 149 and thereby increases the locking effect and the resistance to both tension and compression forces which may be applied between pipe 149 and housing 141.

Figure 12:
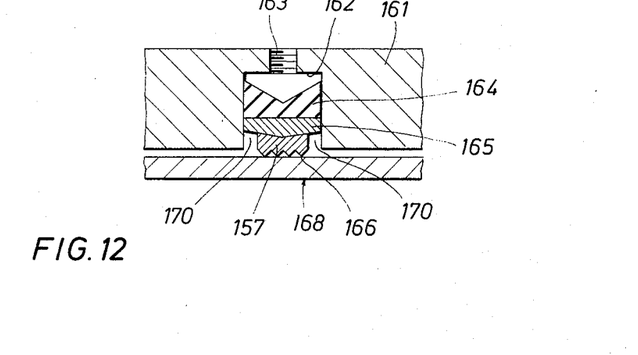
FIG. 12 is a fragmentary longitudinal sectional view of a still further alternate embodiment of the locking means of this invention shown in the locked position.

Referring now to FIG. 12, the coupling housing 161 is shown having annular recess 162 provided therein with communications thereto provided through inlet 163. Recess 162 has mounted therein annular grip seal ring 164 which has a V-shaped configuration adjacent to the base of recess 162 and forms a chamber therewith. Grip seal ring 164 is arranged to bear radially against split lock ring 165 which has a double taper on the opposite side thereof. A double tapered slip grip ring 166 is mounted radially adjacent lock ring 165 and is provided with teeth 167 for frictionally engaging pipe 168 in a locking position upon actuation thereof.

In operation, fluid pressure, such as pressurized epoxy, is applied through inlet 163 which forces seal ring 164 radially out of recess 162. This causes grip seal ring 164 to bear against lock ring 165 which in turn causes grip ring 166 to engage and lock with pipe 168. After lock ring 165 and grip ring 166 have become set, any axial movement of pipe 168 relative to coupling housing 161 causes grip ring 166 to become wedged tighter against pipe 168 because of the tapering surfaces between lock ring 165 and grip ring 166. Because of these two tapers, grip ring 166 is energized into greater gripping engagement with pipe 168 in the event of relative movement of pipe 168 in either axial direction. It will be noted that there is a space 170 provided on each axial end of grip ring 166 and the shoulders of recess 162. These spaces are important so that grip ring 166 is free for axial movement, whereas axial movement of lock ring 165 is restricted by the shoulders of recess 162. It will thus be seen that this is another embodiment which provides for increased resistance to both compression and tension forces which might be exerted between pipe 168 and the coupling housing 161, as was the case with certain of the previously described embodiments.

Further modifications and alternative embodiments of the invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. In an apparatus for closing the end of a tubular member, the combination comprising:
a plug member arranged for insertion in the end of said tubular member in telescopic relationship therewith, said plug member having at least two axially spaced apart annular recesses thereabout, with each of said recesses facing radially outward;
an annular resilient seal supported in one of said recesses and forming an annular closed chamber radially inwardly thereof, with said seal being arranged for sealing engagement between said plug member and the internal surface of said tubular member upon radially outward deformation thereof;
means for applying fluid pressure to said annular chamber to deform said seal radially outwardly to said sealing position;
another annular resilient ring supported in another of said recesses and forming another annular closed chamber radially inwardly thereof;
means supported by said other resilient ring for locking said plug member in said telescopic position upon actuation thereof;
and means for applying fluid pressure to said other annular chamber to deform said other ring radially outwardly and urge said locking means to said locking position.

2. The invention as claimed in claim 1 wherein:
said seal is supported in said recess which is axially inward from the end of said tublular member and said locking means is mounted in said recess which is axially outward toward the end of said tubular member;
and said means for applying fluid pressure to said other annular chamber includes conduit means for transmitting fluid pressure thereto from said tubular member.

3. The invention as claimed in claim 2 wherein:
said plug member has conduit means therein for relieving fluid pressure from said tubular member at determined times.

4. The invention as claimed in claim 1 wherein:
said plug member includes an external portion which surrounds the outside surface of said tubular member when said plug member is inserted in the end thereof;
said portion having at least one annular recess therein facing radially inwardly
means supported in said external plug portion recess for locking said members in said telescopic position upon actuation thereof; and
fluid pressure actuated means for moving said locking means to the locking position upon actuation thereof.

5. In apparatus for making a connection to a generally tubular member, the combination comprising:
a housing member arranged for mounting in telescopic relationship inside said tubular member, said housing member having two axially spaced apart generally channel shaped annular recesses, with each of said recesses facing in a generally radial direction;
an annular resilient seal mounted in each of said recesses and contacting both side walls thereof to form annular closed chambers radially therebehind, with one of said seals being arranged for sealing engagement between said members upon radial deformation thereof;
means supported radially adjacent the other of said seals for engaging said tubular member at a plurality of circumferentially spaced locations and locking said members in said telescopic position upon actuation thereof; and
means for fluid pressurizing said annular chambers to thereby radially deform said seals, whereby said seal adjacent said locking means urges said locking means to said locking positions and said other seal is moved to said sealing position.

6. The invention as claimed in claim 5 wherein:
said housing member is provided with a third generally channel shaped annular recess facing in a generally radial direction, with said third recess being axially spaced from said recess having said seal supported therein;
a third annular resilient seal mounted in said third recess and contacting both side walls thereof to form another annular closed chamber radially therebehind, with said third seal being arranged for sealing engagement between said members upon radial deformation thereof; and means for fluid pressurizing said third annular chamber, to thereby radially deform said third seal into said sealing position.

7. The invention as claimed in claim 5 wherein:
said housing member is provided with a third generally channel shaped annular recess axially spaced apart from said two recesses and facing in a generally radial direction;
an annular resilient ring mounted in said third recess and forming another annular closed chamber radially therebehind, with said ring arranged for radial deformation in response to fluid pressure applied to said other chamber;
means supported by said ring for holding said members in said telescopic position upon radial deformation of said ring; and
means for fluid pressurizing said other annular closed chamber, to thereby radially deform said ring and move said holding means to said holding position.

8. The invention as claimed in claim 7 wherein:
said housing member is provided with a fourth generally channel shaped annular recess axially spaced apart from said first three recesses, and with said fourth recess facing in a generally radial direction;

another annular resilient seal mounted in said fourth recess and contacting both side walls thereof to form a fourth annular closed chamber radially therebehind, with said seal being arranged for sealing engagement between said members upon radial deformation thereof; and
means for fluid pressurizing said fourth chamber, to thereby radially deform said other seal into said sealing position.

9. The invention as claimed in claim 5 wherein:
said locking means includes a split ring mounted radially adjacent said other seal, with said ring having one radial side arranged for contact by said other seal, and with the other radial side thereof having means for frictionally engaging said tubular member upon actuation.

10. The invention as claimed in claim 9 wherein:
the side of said split ring adjacent said seal is tapered in an axial direction, whereby said locking means will resist greater axial force in one direction than in the other.

11. The invention as claimed in claim 9 wherein:
the side of said split ring adjacent said seal is tapered in both axial directions, whereby said locking means resists both tension and compression forces.

12. In apparatus for making a connection to a generally tubular member, the combination comprising:
a housing member arranged for mounting in telescopic relationship inside said tubular member, said housing member having three axially spaced apart generally channel shaped annular recesses, with each of said recesses facing in a generally radial direction;
an annular resilient seal mounted in each of said recesses and contacting both side walls thereof to form annular closed chambers radially therebehind, with two of said axially adjacent seals being arranged for sealing engagement between said members upon radial deformation thereof;
means supported radially adjacent the other of said seals for locking said members in said telescopic position upon actuation thereof;
means for fluid pressurizing said annular chambers to thereby radially deform said seals, whereby said seal adjacent said gripping means urges said gripping means to said locking position and said other seals are moved to said sealing position;
and means for fluid pressurizing the annular chamber formed between said members and between said seals, to thereby test the sealing of said seals forming said testing chamber.

13. The invention as claimed in claim 12 wherein:
said means for fluid pressurizing said annular chamber includes means for flowing a hardenable material into said chamber, whereby said hardenable material, upon hardening, bonds said members together.

14. In a method of sealingly closing the end of a tubular member, the combination of steps comprising:
mounting a plug member in the end of said tubular member in telescopic relationship therewith, said plug member being formed with at least two axially spaced apart annular recesses thereabout, with said recesses facing generally radially outward;
supporting an annular resilient seal in one of said recesses and thereby forming an annular closed chamber radially inwardly thereof;
applying a fluid pressure to said annular chamber to deform said seal radially outwardly into sealing engagement between said members;
supporting an annular resilient ring in another one of said recesses and thereby forming another annular closed chamber radially inwardly thereof;
supporting means for locking said members in said telescopic position radially adjacent said ring; and applying fluid pressure to said other annular chamber to thereby deform said ring radially outwardly and to urge said locking means to said locking position.

15. The invention as claimed in claim 14 including:

supporting said seal in said recess which is axially inward from the end of said tubular member;
supporting said resilient ring and said locking means in said recess which is axially outward toward the end of said tubular member; and
wherein the application of said fluid pressure to said other annular chamber includes flowing pressurized fluid from the interior of said tubular member thereinto.

16. The invention as claimed in claim 14 including:

forming said plug member with an external portion which surrounds the outside surface of said tubular member when said plug member is mounted in the end thereof;
forming at least one annular recess in said external portion, which recess faces generally radially inward;
supporting means responsive to fluid pressure in said recess in said external portion for holding said external portion and said tubular member in fixed relationship upon actuation thereof; and
applying fluid pressure to said holding means to hold said plug in said tubular member.

17. The invention as claimed in claim 16 including:

flowing pressurized fluid from the interior of said tubular member to said recess in said external portion, to thereby urge said holding means to the holding position.

18. The invention as claimed in claim 17 including:

relieving pressure from said tubular member prior to removing said plug from the end of said tubular member.

19. In a method of making a connection between a coupling member and a generally tubular member, the combination of steps comprising:

telescopically mounting said coupling member inside said cylindrical member, said coupling member and said tubular member being formed with two axially spaced apart generally channel shaped annular recesses, with each of said recesses facing in a generally radial direction;

supporting an annular resilient seal in each of said recesses in contact with both side walls thereof to thereby form a closed annular chamber radially back of each of said seals;

supporting radially adjacent one of said seals means for engaging one of said members at a plurality of circumferentially spaced locations and locking said members in said telescopic position; and applying fluid pressure to said annular chambers to move said seals radially until said seal adjacent said locking means urges said locking means to the locked positions and said other seal is moved to a position of sealing engagement between said members.

20. The invention as claimed in claim 19 including:

forming said members with a third generally channel shaped annular recess at the interface therebetween, with said third recess facing in a generally radial direction;

supporting another annular seal in said third recess in contact with both side walls thereof to thereby form another annular closed chamber radially therebehind; and applying a fluid pressure to said other chamber to thereby radially deform said other seal into sealing engagement between said members.

21. The invention as claimed in claim 19 including:

forming said pair of recesses in one of said members and facing in the same radial direction; and applying said fluid pressure to said annular chambers to move said seal in the same radial direction.

22. The invention as claimed in claim 19 including:

forming a third generally channel shaped annular recess in said members, with said third recess being axially apart from said pair of recesses and facing in a generally radial direction;

mounting an annular resilient ring in said third recess in contact with both side walls thereof to thereby form another annular closed radially therebehind;

supporting means for holding said members in said telescopic position on said resilient ring; and applying fluid pressure to said other annular chamber, to thereby radially deform said ring and move said holding means to said holding position.

23. In a method of making a connection between a coupling member and a generally tubular member, the combination of steps comprising:

telescopically mounting said coupling member inside said tubular member, said coupling member and said tubular member being formed with three axially spaced apart generally channel shaped annular recesses, with each of said recesses facing in a generally radial direction;

supporting an annular resilient seal in each of said recesses in contact with both side walls thereof to thereby form a closed annular chamber radially back of each of said seals;

supporting means for locking said members in said telescopic position radially adjacent to one of said seals, and with the other two seals being axially adjacent to each other;

applying fluid pressure to said annular chambers to move said seals radially until said seal adjacent said locking means urges said locking means to the locked position and said other seals are moved to positions of sealing engagement between said members and form a closed annular testing chamber therewith;

and, forcing a pressurized fluid into said closed chamber to test the sealing of said seals forming said testing chamber.

24. The invention as claimed in claim 23 including:

flowing a hardenable material into said testing chamber, to thereby bond said members together upon hardening of said material.

* * * * *